United States Patent
El-Naaman et al.

(10) Patent No.: US 12,454,938 B2
(45) Date of Patent: Oct. 28, 2025

(54) DEVICES AND METHODS FOR MITIGATING VIBRATIONS IN WIND TURBINES

(71) Applicant: General Electric Renovables Espana, S.L., Barcelona (ES)

(72) Inventors: Salim El-Naaman, Kongens Lyngby (DK); Christian Kjer Elkjær, Kolding (DK); Maurits Bakkum, Heerhugowaard (NL); Casper Kildegaard, Lunderskov (DK); Andreas Herrig, Garching (DE)

(73) Assignee: GE Vernova Renovables Espana, S.L., Barcelona (ES)

( * ) Notice: Subject to any disclaimer, the term of this patent is extended or adjusted under 35 U.S.C. 154(b) by 29 days.

(21) Appl. No.: 18/354,047

(22) Filed: Jul. 18, 2023

(65) Prior Publication Data
US 2024/0026855 A1    Jan. 25, 2024

(30) Foreign Application Priority Data

Jul. 19, 2022    (EP) .................................... 22382695

(51) Int. Cl.
*F03D 1/06*    (2006.01)
*F03D 7/02*    (2006.01)
*F03D 17/00*    (2016.01)

(52) U.S. Cl.
CPC ....... *F03D 1/06495* (2023.08); *F03D 1/0641* (2013.01); *F03D 1/0648* (2023.08);
(Continued)

(58) Field of Classification Search
CPC ............ F05B 2260/96; F05B 2270/334; F05B 2240/31; F05B 2240/311; F05B 2240/301;
(Continued)

(56) References Cited

U.S. PATENT DOCUMENTS

| | | | |
|---|---|---|---|
| 2012/0141271 A1* | 6/2012 | Southwick | F03D 7/0232 416/1 |
| 2017/0370386 A1 | 12/2017 | Wardropper et al. | |
| 2021/0079896 A1 | 3/2021 | Herrig et al. | |

(Continued)

FOREIGN PATENT DOCUMENTS

| | | | |
|---|---|---|---|
| CN | 111271218 A | * | 6/2020 |
| EP | 3736437 A1 | | 11/2020 |
| EP | 4008901 A1 | | 6/2022 |

(Continued)

OTHER PUBLICATIONS

English machine transation of CN-111271218-A, Mar. 8, 2024.*
English machine transation of KR-10-1434469-B1, Mar. 8, 2024.*
English machine transation of WO-2014/098527-A1, Mar. 8, 2024.*
European Search Report Corresponding to EP22382695 on Jan. 26, 2023.

*Primary Examiner* — Christopher Verdier
(74) *Attorney, Agent, or Firm* — Dority & Manning, P.A.

(57) ABSTRACT

An assembly and associated method of operation for a wind turbine blade of a wind turbine includes a vibration mitigating device configured to be arranged around the blade. The vibration mitigating device includes a main body configured to extend chord-wise around and encircle the blade, the main body having at least one inflatable body. Inflatable air flow modifying elements extend radially outward from the main body. A pressure source is connectable to the inflatable body and the air flow modifying elements to inflate the inflatable body and the airflow modifying elements based on measurements of a sensor system that monitors a condition of the wind turbine or an environmental condition around the wind turbine.

20 Claims, 8 Drawing Sheets

(52) U.S. Cl.
CPC ......... *F03D 7/0298* (2023.08); *F03D 17/015* (2023.08); *F03D 17/028* (2023.08); *F05B 2240/301* (2013.01); *F05B 2240/311* (2013.01); *F05B 2260/96* (2013.01); *F05B 2270/334* (2013.01)

(58) Field of Classification Search
CPC ........ F05B 2240/313; F05B 2240/3052; F05B 2260/964; F03D 1/0648; F03D 1/0633; F03D 1/0641; F03D 7/0296; F03D 7/0298; F03D 17/015; F03D 17/00; F03D 3/061; F03D 3/064; F03D 3/066; F03D 3/06495; F03D 7/0232; F03D 7/0236; F03D 1/0685; F03D 7/0264; F03D 7/0268; F03D 17/017
See application file for complete search history.

(56) References Cited

U.S. PATENT DOCUMENTS

| | | | |
|---|---|---|---|
| 2023/0104837 A1* | 4/2023 | Danielsen | F03D 80/00 |
| | | | 416/146 R |
| 2023/0106043 A1* | 4/2023 | Danielsen | F03D 13/30 |
| | | | 416/244 R |
| 2023/0108569 A1* | 4/2023 | Canal Vila | F03D 1/0675 |
| | | | 416/146 R |
| 2024/0263610 A1* | 8/2024 | Herrig | F03D 1/0685 |

FOREIGN PATENT DOCUMENTS

| | | | |
|---|---|---|---|
| KR | 101313810 B1 | | 9/2013 |
| KR | 10-1434469 B1 | * | 8/2014 |
| WO | WO-2014/098527 A1 | * | 6/2014 |
| WO | WO-2023/057039 A1 | * | 4/2023 |

\* cited by examiner

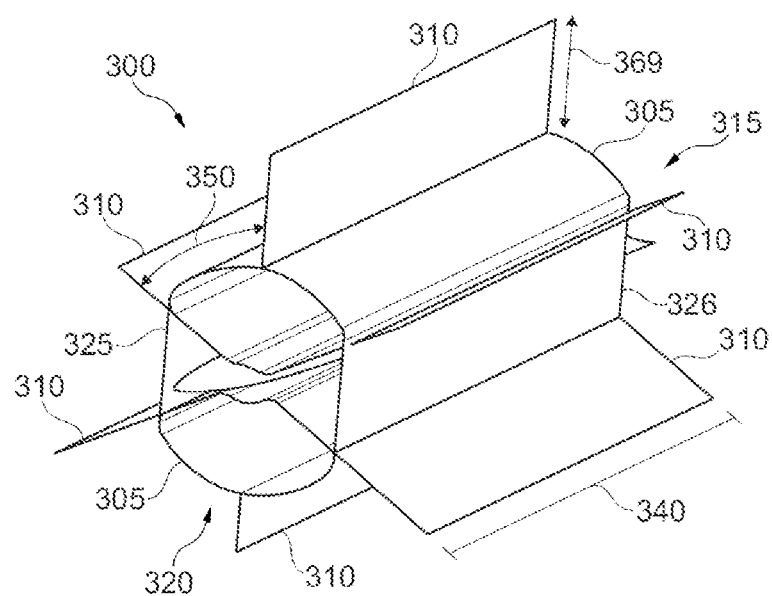
Fig. 7B
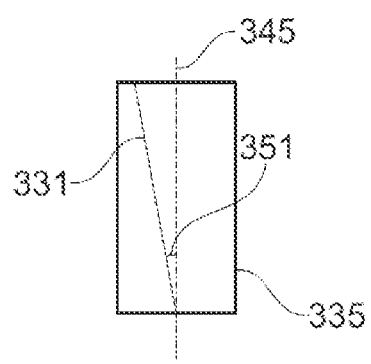 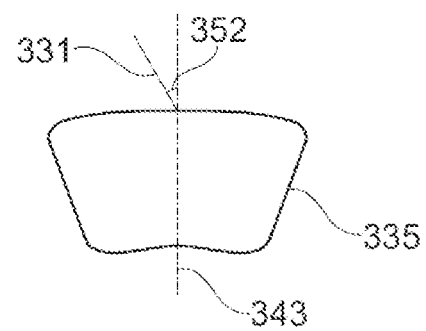
Fig. 8A                Fig. 8B

DEVICES AND METHODS FOR MITIGATING VIBRATIONS IN WIND TURBINES

The present disclosure relates to methods for reducing vibrations in parked wind turbines and assemblies comprising vibration mitigating devices for wind turbine blades. The present disclosure further relates to vibration mitigating devices and wind turbines.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

There is a trend to make wind turbine blades increasingly longer to capture more wind and convert the energy of the wind into electricity. This makes blades more flexible and more prone to vibrations of the blades. Wind turbine blades vibrating excessively may get damaged. Vibrations of the rotor blades may also result in the whole wind turbine structure oscillating e.g. fore-aft oscillations, or sideways oscillations. Vibrations in the wind turbine blade may also damage other components of the wind turbine due to excessive stress.

When the wind turbine is in operation (i.e. producing energy and connected to an electrical grid), a wind turbine controller may operate auxiliary drive systems such as a pitch system or a yaw system to reduce or change loads on the blades. This way, vibrations of the blades may be counteracted. However, the problem of vibrations can be serious as well in circumstances when the wind turbine is stopped or parked and/or disconnected from the grid.

When a wind turbine is parked, the wind may blow against the wind turbine from unusual directions, i.e. different from when in normal operation. The airflow around the wind turbine may cause the wind turbine to vibrate. Vibrations may stress and even damage one or more wind turbine components, which may compromise the performance of the wind turbine, increase the need of repairs and reduce the lifespan of the wind turbine. As an orientation of a wind turbine blade cannot be adapted to the direction of the incoming wind, e.g. through yawing and/or pitching as opposed to when the wind turbine is operating, the effects of vibrations may be greater or different when the wind turbine is parked than when the wind turbine is operating normally and producing energy.

In particular, this may apply when the wind turbine is being installed or commissioned. For example, it may happen that an incomplete rotor is installed (e.g. a rotor having a single blade or two blades out of the total of three blades). The remaining blades may not be installed until a few days or a week later. In the meantime, the partially installed (or "incomplete") rotor may be in standstill. Similarly, a complete rotor may have been installed but the grid or a connection to the grid may be unavailable for weeks or months while installation of a wind park continues. The rotor may or may not be locked, and the wind turbine can be exposed to varying wind conditions. This may likewise apply if the wind turbine is stopped during several hours, days or weeks, e.g. for maintenance reasons. A wind turbine blade can start to vibrate in any of these conditions depending particularly on the direction of the wind.

SUMMARY

In an aspect of the present disclosure, an assembly is provided. The assembly comprises a vibration mitigating device and a pressure source. The vibration mitigating device comprises one or more inflatable bodies and one or more air flow modifying elements. The vibration mitigating device is configured to be arranged around a wind turbine blade of a wind turbine. The pressure source is configured to inflate and/or deflate one or more of the inflatable bodies based on measurements of a sensor system configured to monitor the wind turbine and/or environmental conditions around the wind turbine.

According to this aspect, when the vibration mitigating device is arranged around a wind turbine blade, a pressure source may be controlled to keep, increase or decrease an inflation level of one or more inflatable bodies of the vibration mitigating devices based on the output of a sensor system. Therefore, a continuous regulation of the inflation level of one or more inflatable bodies of the vibration mitigating devices adapted to the circumstances may be performed. The reliability and effectivity of vibration mitigation may be improved.

Throughout this disclosure, an air flow modifying element may be understood as an element configured to significantly disturb an air flow, e.g. its magnitude and/or its direction, around a wind turbine blade. In particular, an air flow modifying element may be configured to significantly disturb an air flow before the air flow reaches a local surface of a wind turbine blade. For example, air flow, or a component of the air flow, moving towards a local blade surface in a direction substantially perpendicular to a length of the blade may encounter the air flow modifying element. An air flow modifying element may be configured to increase drag in oscillation. In some examples, an air flow modifying element may be inflatable, e.g. it may be one of the inflatable bodies.

Throughout this disclosure, a pressure source may be understood as an element or device configured to move a fluid into the pressure source, e.g. by sucking the fluid, and/or to move a fluid out of the pressure source e.g. by blowing the fluid. Examples of a pressure source are pumps, including vacuum pumps, and compressors. By using a pressure source, e.g. a compressor, a fluid may be caused to enter an inflatable body of the vibration mitigating device. Additionally or alternatively, a fluid may be drawn out of an inflatable body of the vibration mitigating device by using a pressure source.

Throughout the present disclosure, the terms "standstill" and "parked" are used interchangeably, and may be understood as a situation in which the wind turbine is not producing electricity, and the rotor is substantially standing still. The rotor may or may not be locked in standstill. For instance, a wind turbine may be parked or in standstill during installation and/or commissioning. A wind turbine may also be parked for e.g. maintenance reasons after operating normally, i.e. producing energy, or in case of a prolonged grid loss.

Herein it may be understood that a wind turbine is in operation when its rotor is rotating at a speed that is high enough to produce energy and the generator of the wind turbine is producing electrical power.

In a further aspect of the disclosure, a method for mitigating vibrations of a parked wind turbine is provided. At least one of the wind turbine blades of the parked wind turbine comprises a vibration mitigating device arranged around the wind turbine blade. The vibration mitigating device comprises one or more inflatable bodies and one or more air flow modifying elements. The method comprises monitoring at least one of the wind turbine and an environment around the wind turbine. The method further comprises inflating or deflating one or more of the inflatable bodies of the vibration mitigating device in response to the monitoring.

Still in a further aspect of the disclosure, a method for mitigating vibrations of a parked wind turbine is provided. The method comprises releasably positioning a vibration mitigating device around a wind turbine blade. The vibration mitigating device comprises one or more inflatable bodies and one or more air flow modifying elements. The method further comprises inflating one or more inflatable bodies for securing the vibration mitigating device to the wind turbine blade. The method further comprises monitoring wind turbine loading. The method further compromises, based on the wind turbine loading, regulating an inflation state of one or more inflatable bodies of the vibration mitigating device.

BRIEF DESCRIPTION OF THE DRAWINGS

FIGS. 7A and 7B schematically illustrate two perspective views of another example of a vibration mitigating device;

FIGS. 8A and 8B schematically respectively illustrate a top view and a front view of the suction side inflatable body of FIGS. 7A and 7B;

DETAILED DESCRIPTION OF EXAMPLES

Figure 1:
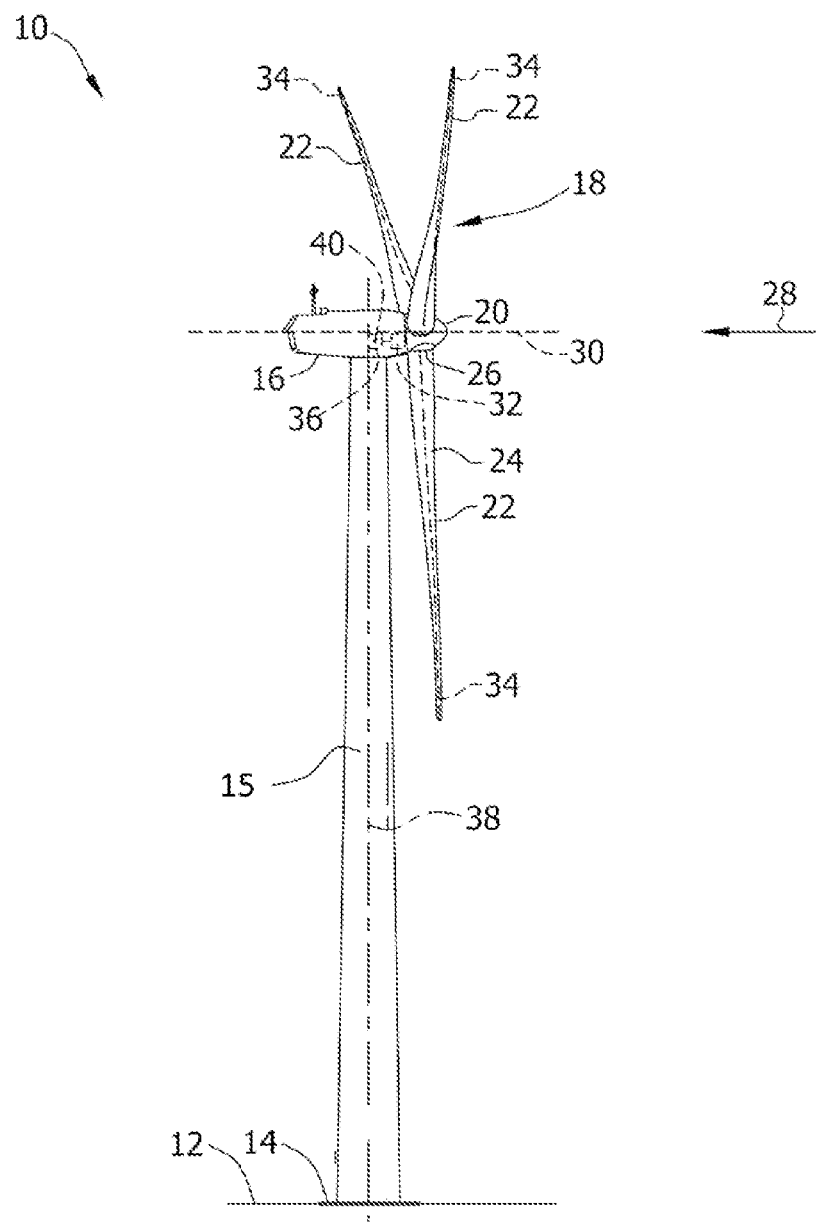
FIG. 1 illustrates a perspective view of one example of a wind turbine.

Reference now will be made in detail to embodiments, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 may include a processor 40 configured to perform some of the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

A control system 36 may also include a memory, e.g. one or more memory devices. A memory may comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s) 40, configure the controller 36 to perform, or trigger the performance of, various steps disclosed herein. A memory may also be configured to store data, e.g. from measurements and/or calculations.

Figure 2:
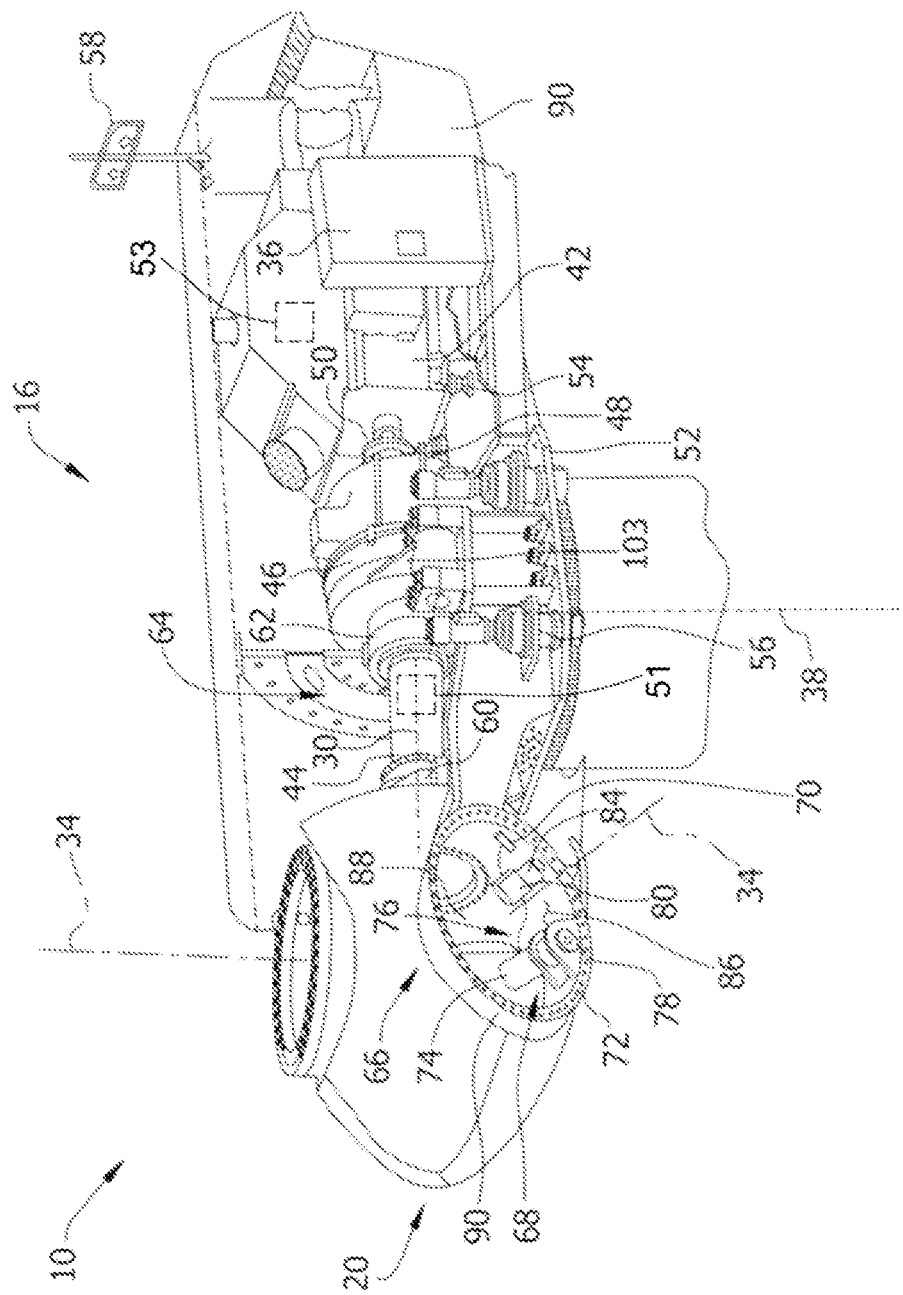
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
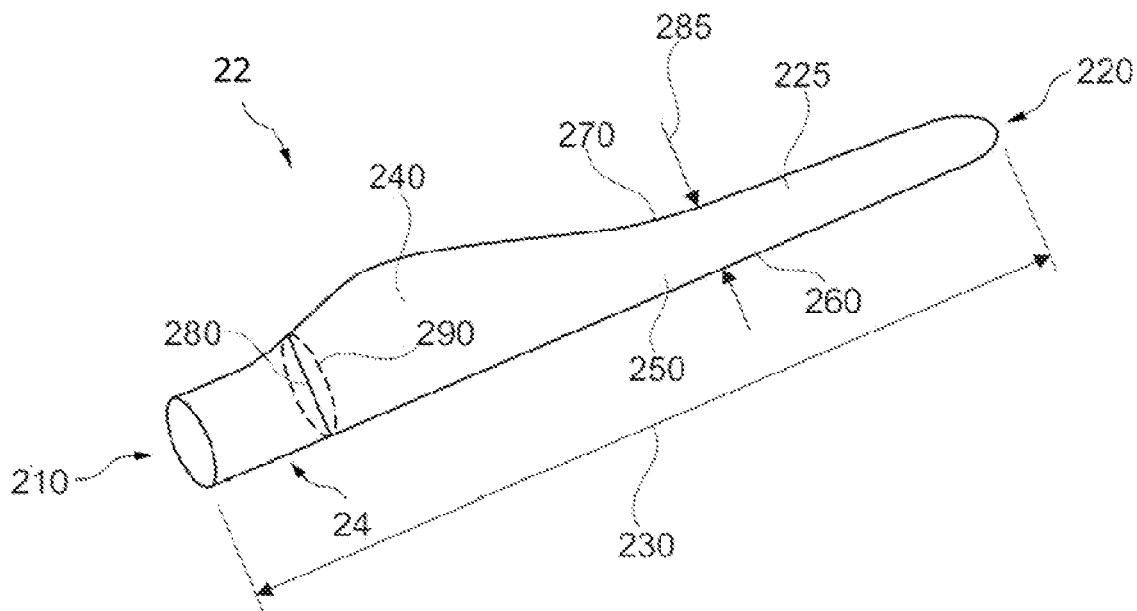
FIG. 3 illustrates a schematic perspective view of a wind turbine blade shown in FIG. 1.

A schematic perspective view of a wind turbine blade 22, e.g. one of the rotor blades 22 shown in FIG. 1, is illustrated as an example in FIG. 3. The rotor blade 22 includes a blade root 210, a blade tip 220, a leading edge 260 and a trailing edge 270. The blade root 210 is configured for mounting the rotor blade 22 to the hub of a wind turbine 10. The wind turbine blade 22 extends lengthwise between the blade root 210 and the blade tip 220. A span 230 defines a length of the rotor blade 22 between said blade root 210 and blade tip 220. A chord 280 at a given position of the blade is an imaginary straight line joining the leading edge 260 and the trailing edge 270, the cross-section generally having airfoil shaped cross-section. As is generally understood, a chordwise direction is substantially perpendicular to a spanwise direction. Also, the chord 280 may vary in length 285 as the rotor blade 22 extends from the blade root 210 to the blade tip 220. The wind turbine blade 22 also includes a pressure side 240 and a suction side 250 extending between the leading edge 260 and the trailing edge 270. A tip region 225 may be understood as a portion of a wind turbine blade 22 that includes the tip 220. A tip region may have a length of 33%, 30%, or 25% of the span or less. A root region 24 may be understood as a portion of the blade that includes root 210. A root region may have a length of e.g. 33%, 30% of the span or less.

The rotor blade 22, at different spanwise positions, has different aerodynamic profiles and thus can have airfoil shaped cross-sections 290, such as a symmetrical or cambered airfoil-shaped cross-section. Close to a root of the blade, the cross-section of the blade may be rounded, even circular or almost circular. Closer to a tip of the blade, the cross-section of the blade may be thinner and may have an airfoil shape.

When a wind turbine is parked or stopped, vibrations caused by the air flowing around the wind turbine, in particular around the wind turbine blades, may stress and damage the wind turbine blades and the wind turbine. The wind turbine rotor may or may not be locked in these situations.

At least two types of oscillations or vibrations may happen particularly when the turbine is parked. The first ones are so-called vortex induced vibrations (VIVs), and these can arise when an angle of attack for a blade or airfoil portion is around 90 degrees. Vortex shedding may contribute to enhance the wind turbine blade oscillation. The second type of oscillations are stall induced vibrations (SIVs) which can arise when the angle of attack is close to stall angles (e.g. 15 degrees-30 degrees). The angle of attack may be understood as a geometrical angle between a flow direction of the wind and the chord of a rotor blade or a local chord of a rotor blade section.

Devices 300 as described herein may reduce vibrations particularly when the wind turbine is parked. The performance of the wind turbine may not be negatively affected as the device(s) may be removed before the wind turbine starts normal operation. One or more devices 300 may be particularly useful during installation and/or commissioning of a wind turbine. They may also be useful if the wind turbine is stopped, e.g. for maintenance.

In an aspect of the disclosure, an assembly 82 is provided. An example of an assembly 82 mounted to a wind turbine may be seen in FIG. 4. The assembly 82 comprises a vibration mitigating device 300 comprising one or more inflatable bodies 305 and one or more air flow modifying elements 310. At least one of the one or more inflatable bodies 305 may be configured to be inflated and push towards, e.g. against, a wind turbine blade surface when inflated at least in part. The device 300 is configured to be arranged around a wind turbine blade 22. The assembly 82 further comprises a pressure source 98 configured to inflate and/or deflate one or more of the inflatable bodies 305 based on measurements of a sensor system 97 configured to monitor the wind turbine and/or environmental conditions around the wind turbine.

According to this aspect, a vibration mitigating device 300 with inflatable bodies 305 can be provided. If arranged with, e.g. placed around, a portion of a wind turbine blade 22 in deflated state, the device 300 may not be able be able to grip the wind turbine blade 22. When inflating one or more of the inflatable bodies 305 of the device, the pressure exerted by them on a local wind turbine blade surface starts to increase and the device may grip the wind turbine blade 22. In use, the device 300 may modify the air flowing around the wind turbine blade 22 and avoid, or at least reduce, vortex and/or stall induced vibrations. Controlling the inflation level of one or more of the inflatable bodies 305 while the device 300 is in use may help to tailor the mitigation of the wind turbine vibrations to the variations in loading experienced by the wind turbine over time. Wind turbine vibrations may be mitigated in a controlled and efficient manner.

Installation of the device 300 on a wind turbine blade 22 may also be facilitated by regulating how much each inflatable body 305 is inflated. Using one or more inflatable bodies 305 may further facilitate storing the device 300 (in a deflated or partially deflated state) and transporting it to a wind turbine site. Obtaining complex shapes and a variety of sizes of the vibration mitigating device 300 may also be easier than without the use of the inflatable bodies 305. Inflatable bodies, by their nature, are adaptable to complicated blade surfaces with doubly curved surfaces.

In some examples, one or more inflatable bodies 305 may be air flow modifying elements 310 at least in part. For instance, an entire inflatable body 305, or a portion thereof, may be capable of acting as an air flow modifying element, see the example of FIGS. 6A and 6B. In some examples, one or more air flow modifying elements 310 may be inflatable, e.g. at least one of the air flow modifying elements 310 may be one of the inflatable bodies 305. In these or other examples, one or more air flow modifying elements 310 may be non-inflatable.

A pressure source 98 may be a pump or a compressor in some examples. A compressed gas bottle may be used in other examples. A dedicated pressure source 98 may be provided for each of the individual inflatable bodies 305 of the vibration mitigating device 300. A pressure source 98 may be provided in the device, e.g. in an inflatable body 305. For example, a compressor or gas bottle may be provided in an inflatable body. Alternatively, a pressure source 98 may be provided separately from the device 300, e.g. the pressure source 98 may be configured to be arranged within a wind turbine hub 20.

In some examples, the vibration mitigating device 300 may comprise one or more receivers such as one or more antennas. The receiver(s) may allow to receive signals, e.g. wirelessly, from a controller 36, e.g. a wind turbine controller. Inflation and/or deflation of one or more inflatable bodies 305 may be adjusted through such signals.

In some examples, the vibration mitigating device 300 may comprise a plurality of air flow modifying elements 310 configured to be arranged at a suction side 250 of the wind turbine blade 22 and a plurality of air flow modifying elements 310 configured to be arranged at a pressure side 240 of the wind turbine blade 22. In these or in other examples, at least one of the air flow modifying elements 310 may be a plate or a fin.

In a further aspect of the disclosure, a wind turbine 10, e.g. a wind turbine such as in FIG. 1, comprising a tower 15, a nacelle 16, a hub 20, one or more wind turbine blades 22, and an assembly 82 as described herein is provided. At least one of the wind turbine blades 22 comprises a vibration mitigating device 300 arranged around a wind turbine blade 22. The vibration mitigating device 300 comprises one or more inflatable bodies 305 and one or more air flow modifying elements 310. At least one of the one or more inflatable bodies 305 may be configured to be inflated and push towards, e.g. against, a wind turbine blade surface when inflated at least in part. The wind turbine 10 further comprises a sensor system 97 configured to monitor the wind turbine 10 and/or environmental conditions around the wind turbine 10. At least one of the wind turbine 10 and the vibration mitigating device 300 comprises a pressure source 98 configured to inflate and deflate one or more of the one or more inflatable bodies 305 based on measurements of the sensor system 97.

A sensor system 97 may comprise one or more load sensors for determining loads on a component of a wind turbine such ad e.g. a rotor shaft of a wind turbine, and/or on a generator 42 of the wind turbine, and/or on one or more of the wind turbine blades in some examples. A sensor system 97 may additionally or alternatively be configured to measure ambient conditions such as one or more of wind speed, wind direction, air density and turbulence.

Figure 4:
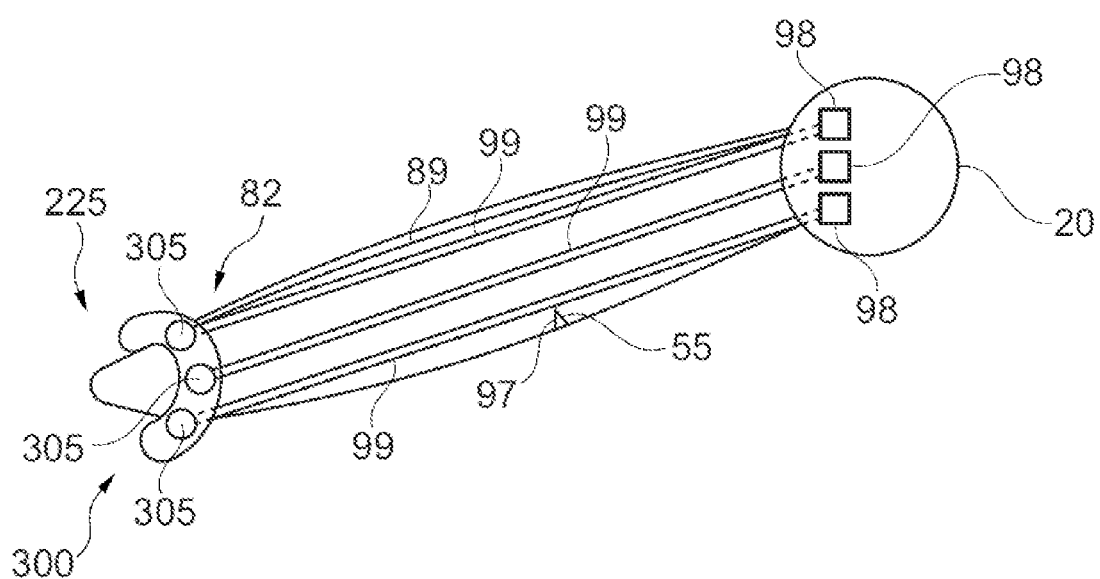
FIG. 4 schematically illustrates an example of an assembly coupled to a wind turbine.

In some examples, a sensor system 97 may comprise one or more of a wind turbine shaft sensor 51, a wind turbine generator sensor 53, a wind turbine blade sensor 55 and a meteorological measurement system 58, see FIGS. 2 and 4. A shaft sensor 51 may be configured to monitor at least one of torque loads acting on the main shaft 44 and/or the high-speed shaft 48, and a rotational speed of the shaft 44, 48. A generator sensor 53 may be configured to monitor at least one of a rotational speed of the generator 42 and a generator torque. Shaft sensors 51 and/or generator sensors 53 may include, for instance, one or more torque sensors (e.g., strain gauges or pressure sensors), optical sensors, accelerometers, magnetic sensors, speed sensors and Micro-Inertial Measurement Units (MIMUs). These types of sensors may also be arranged with a wind turbine blade 22, e.g. on a blade outer surface, and therefore be wind turbine blade sensors 55. A meteorological measurement system 58, e.g. a wind anemometer, may be configured to determine for example wind speed.

In some examples, the wind turbine may include a controller 36 configured to control the pressure source 98. The controller may for example, but not necessarily, be the main wind turbine controller. The controller 36 may receive information from one or more sensors 97, and based on this information, may signal the pressure source 98 whether to inflate or deflate one or more inflation bodies 305 of the vibration mitigating device 300. A signal may for example comprise a value of pressure, pressure difference, volume, volume difference, volumetric flow rate or other suitable magnitude. If an inflatable body does not need to be inflated or to be deflated, the controller may avoid sending a signal to the pressure source 98. It may also be possible that the controller may signal the pressure source 98 to maintain a current inflation level. In some examples, a controller may be a wind park controller, a substation controller or any other suitable controller.

In addition to a processor and a memory, a controller may also include a communications module to facilitate communications between the controller 36 and the various components of the wind turbine 10. For instance, the communications module may serve as an interface to enable the turbine controller 36 to transmit control signals to a pressure source 98 for inflating or deflating an inflatable body. The communications module may be configured to communicatively connect the control system 36 with other elements of the wind turbine 10. Connecting may be carried out via a wired connection and/or via a wireless connection, e.g. by using any suitable wireless communications protocol known in the art. Moreover, the communications module may include a sensor system interface, e.g. one or more analog-to-digital converters, to permit signals transmitted from one or more sensors 51, 53, 58 of the sensor system 92 to be converted into signals that can be understood and processed by the processor(s) of the controller. The communications module may also enable communication with the vibration mitigating device 300 in some examples, e.g. with one or more receivers such as antennas of the vibration mitigating device.

The pressure source 98 may be a pump or a compressor in some examples. Any suitable type of pump, and in general any suitable type of pressure source, may be used to inflate and deflate an inflatable body 305 of the vibration mitigating device 300.

The pressure source 98 may be arranged with the wind turbine hub 20, the nacelle 16 or a wind turbine blade 22 in some examples. FIG. 4 schematically illustrates a plurality of pressure sources 98 in a wind turbine hub 20 fluidly connected to inflatable bodies 305 of a vibration mitigating device 300 arranged around a wind turbine blade 22. A hose 99 may fluidly connect an inflatable body 305, in particular a chamber 301 of an inflatable body 305, and the pressure source 98. An inflatable body 305 may have a suitable inlet 95 for receiving a hose 99. A vibration mitigating device 300 comprising three inflatable bodies 305 is provided at a tip region 225 of the wind turbine blade 22. A pressure regulator for regulating the pressure of a fluid outputted by the pressure source towards an inflatable body 305 may be coupled between the pressure source 98 and the hose 99 in some examples. A pressure regulator may also be coupled between the hose 99 and an inlet of an inflatable body 305.

In some examples, such as in the example of FIG. 4, a dedicated pressure source 98 may be provided for each of the individual inflatable bodies 305 of the vibration mitigating device 300 whose inflation state is to be controlled. A hose 99 may fluidly connect a pressure source 98 to each corresponding inflatable body 305 of the device 300. The hoses 99 may be secured to the wind turbine blade 22. In other examples, a plurality of hoses 99 may fluidly connect a pressure source 98, e.g. a single pressure source 98, to multiple or all inflatable bodies 305 which are to be controlled. In such examples, individual pressure regulators, e.g. over-pressure valves or electrovalves, may for example be provided between a hose 99 and individual inflatable bodies 305.

Figure 5A:
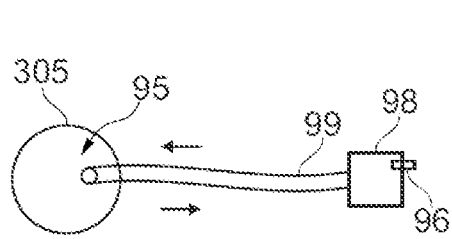
FIGS. 5A to 5C schematically illustrate different examples of how an inflatable body of a vibration mitigating device may be inflated and deflated.
Figure 5B:
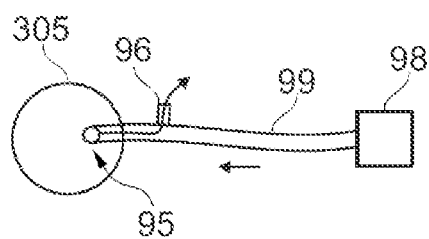
Figure 5C:
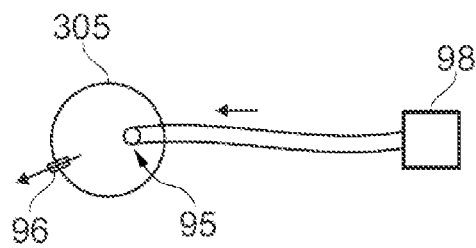

FIGS. 5A to 5C schematically show different examples of how an inflatable body 305 of a vibration mitigating device 300 may be inflated and deflated. In FIGS. 5A, 5B and 5C, a fluid such as air is caused to flow through the hose 99 towards the inflatable body 305 to inflate it. In these figures, a fluid output 96 through which a fluid inside the inflatable body 305 may be outputted is provided in different locations. A fluid output 96 may comprise a valve. One or more suitable valves, e.g. one-way or two-way valves, may be provided in the inlets and/or outlets of the pressure source 98 and/or the inflatable bodies 305 for regulating the inflation and deflation of one or more inflatable bodies 305. A pressure source 98 may be connected to the fluid output 96, e.g. through a wired or a wireless connection, and may control the fluid output 96, e.g. the pressure source 98 may indicate a valve to open or close. In other examples, the controller 36 may regulate the opening and closing of the fluid output 96.

To deflate the inflatable body 305, a fluid inside the inflatable body 305 is caused to exit the body 305, go through the hose 99 and exit through a fluid output 96 of the pressure source 98 in FIG. 5A. For deflating, in FIG. 5B the pressure source 98 causes a fluid output 96 of the hose 99 to open such as a fluid inside the inflatable body 305 flows through a portion of the hose 99 and then out of the hose 99 through the fluid output 96 of the hose 99. In FIG. 5C, the inflatable body 305 comprises a fluid output 96 through which a fluid inside the inflatable body 305 exits when the pressure source 98 opens the fluid output 96.

In other examples, one or more pressure sources 98 may be provided in the device 300. For instance, a dedicated pressure source 98 may be arranged, e.g. integrated, with each inflatable body 305 of the device whose inflation state is to be regulated. In some examples the pressure source 98 may be configured to introduce a fluid to inflate the inflatable body 305 and to extract a fluid to deflate the inflatable body 305, e.g. by blowing or sucking a fluid such as air. In other examples, the pressure source may be configured to introduce a fluid into the inflatable body only. The pressure source 98 may be any suitable type of pump, including a vacuum pump. A vacuum pump may deflate an inflatable body 305 by sucking a fluid and may inflate it by causing a fluid to enter the inflatable body. The fluid may be air. A hose 99 may also be provided to fluidly connect a pressure source 98 and a chamber 301 in some examples.

The controller 36 may control the pressure source 98. In some examples, an inflatable body 305 may have a separate fluid output 96 for exhausting a fluid inside it. The opening and closing of the fluid output 96, e.g. through a valve, may be controlled by the pressure source 98. In other examples, the controller 36 may control the opening and closing of the separate fluid output 96.

In some examples, the vibration mitigating device 300 may be secured to the wind turbine, e.g. to the hub 20, the nacelle 16 or the wind turbine blade 22, by one or more ropes 89. For example, the blade 22 may include one or more anchor points to which the ropes 89 may be attached. The vibration mitigating device 300 may similarly comprise one or more anchor points, e.g. anchor rings, to which one or more ropes 89 are attached to. Attachment of the one or more ropes 89 may ensure that the vibration mitigating device 300 is kept in place and avoid that it falls down, e.g. by sliding towards a blade tip 220.

Figure 6A:
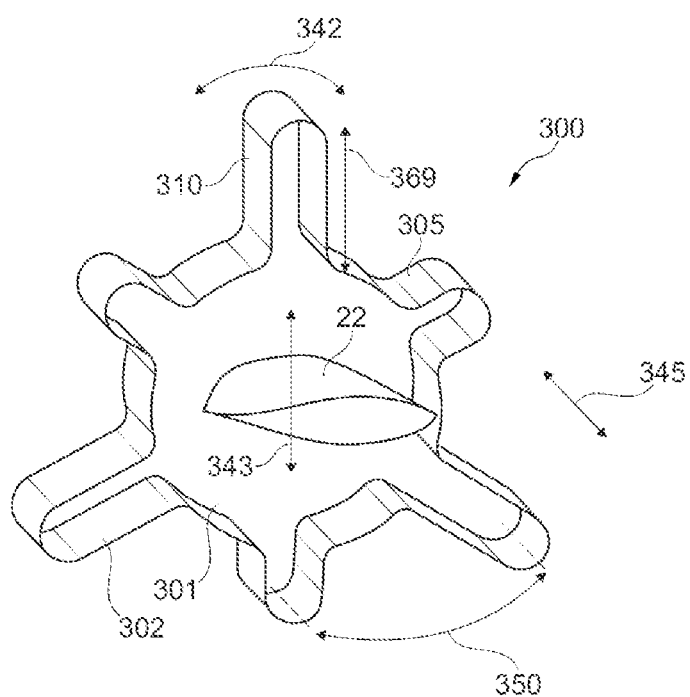
FIGS. 6A and 6B schematically illustrate two perspective views of an example of a vibration mitigating device.
Figure 6B:
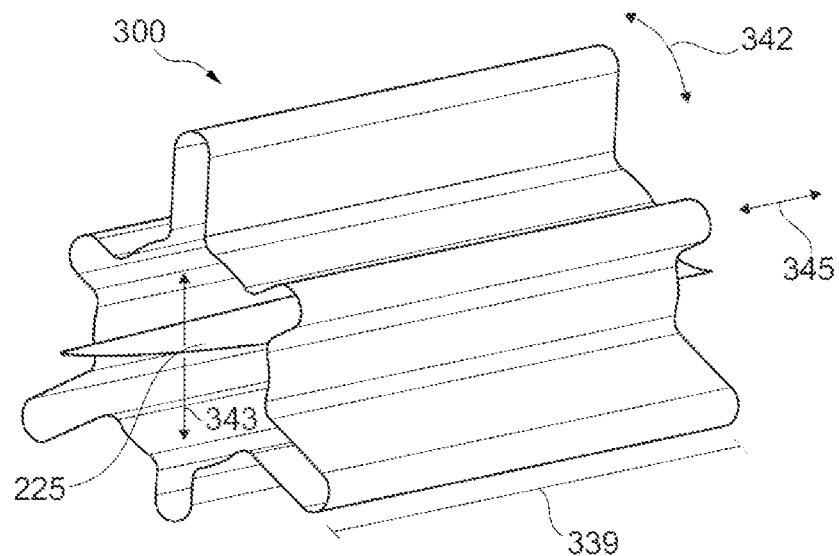

In some examples, at least one of the one or more inflatable bodies 305 may be configured to push against or exert pressure on a wind turbine blade surface when inflated at least in part. FIGS. 6A and 6B schematically illustrate two perspective views of an example of a vibration mitigating device 300. In these figures, the device 300 is formed by a single inflatable body 305. The inflatable body 305 comprises an internal chamber 301 and a wall 302. The wall 302 delimits the chamber 301. In this particular figure, the longitudinal ends of the wall and a portion of the wall configured to face a wind turbine blade surface are not shown so that an external shape of the device in cross-section can better be appreciated.

When air or another suitable gas, e.g. carbon dioxide, helium or nitrogen, is introduced or allowed to flow into the internal chamber 301, the device 300 is inflated and caused to expand and the wall 302 is pushed outwards. A gas of sufficient pressure, or in general a fluid, may be suitable if it is able to push the wall 410 and inflate the inflatable body. When inflated, the device presses against an outer surface of the blade 22, thereby gripping the blade 22. The device is also capable of disturbing the incoming air flow as inflating the inflatable body 305 also inflates the air flow modifying elements 310 of the device, which in this case are protrusions configured to protrude radially outwards from the device in an inflated state.

The air flow modifying elements 310 may be inflatable bodies. The air flow modifying elements 310 are plate-like inflatable protrusions in the example of FIGS. 6A and 6B, but other shapes of inflatable protrusions, e.g. rib-like protrusions such as rods, bars or similar elements are also possible in other examples. Plate-like may herein be understood as being relatively thin as compared to its width and height.

In the example of FIGS. 6A and 6B, the vibration mitigating device 300 is formed by an inflatable body 305 with a single internal chamber. In other examples, the inflatable body 305 may comprise more than one internal chamber. Providing two, three or more internal chambers 301 may increase the adaptability of the device to varying conditions of the environment when the device is in use. Internal walls may separate and delimit the internal chambers. Each chamber may be inflated and deflated separately from the other internal chambers. Each chamber with its corresponding walls may be seen as an inflatable body in some examples. In case of e.g. a change in wind direction, or oscillation behavior, the way the vibration mitigating device 300 interacts with its surroundings may be adapted by inflating and/or deflating different internal chambers. In some examples, the vibration mitigating device 300 may comprise a first portion configured to specifically mitigate SIVs and a second portion configured to specifically mitigate VIVs. Each of the first and second portions may comprise one or more inflatable bodies. If measurements performed by a sensor system indicate that experienced vibrations are SIVs, the first portion may be inflated. If measurements performed by a sensor system indicate that experienced vibrations are VIVs, the second portion may be inflated. The first and second portions may be inflated at totally, partially or non-overlapping time periods. The first portion and the second portion may share one or more inflatable bodies in some examples.

An inflatable body 305 may have an inlet 95 for introducing a suitable fluid such as a gas. The inlet 95 may also be an outlet through which a fluid may be extracted. In other examples, an inflatable body may have an inlet 95 separate from an outlet 96.

The device 300 may be arranged around a wind turbine blade 22, in particular around a tip region 225 of the blade 22. The tip region may be the portion of the wind turbine blade that vibrates the most when the wind turbine is parked. Therefore, it may be particularly advantageous to fit the device in this region of the blade. In general, all the devices 300 disclosed herein may be arranged around a tip region 225 of a wind turbine blade 22.

A vibration mitigating device 300 may in general have a length 339 along a longitudinal direction 345 and a cross-section substantially perpendicular to the longitudinal direction 345. The cross-section includes a radial direction 343 and a tangential direction 342. When mounted around a wind turbine blade 22, a longitudinal direction 345 of the device 300 may be substantially parallel to a spanwise direction of the blade 22. A width of the device 300 may be measured along a radial direction 343. The width of the device may be a maximum diameter of the device 300 in some examples. The length of the device may refer to a maximum length of the device in some examples.

In the examples shown herein, a length 339 of the device is the same as a length of the air flow modifying elements 310, and all the air flow modifying elements have a same length along the longitudinal direction 345. It should be noted that different air flow modifying elements 310 may have different lengths along a longitudinal direction 345 of the device and that a length of one or more air flow modifying elements may differ from the length of the device.

Figure 7A:
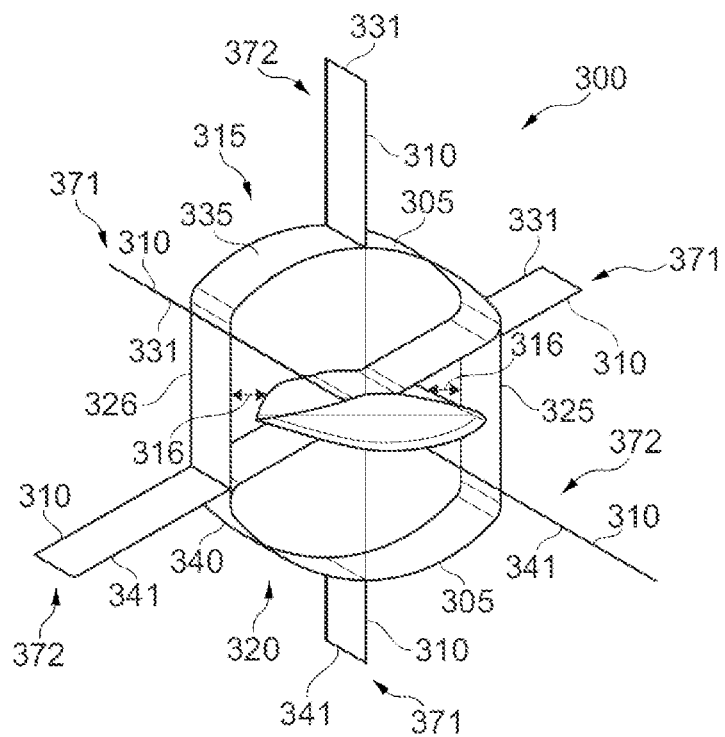

FIGS. 7A and 7B schematically illustrate two perspective views of another example of a vibration mitigating device 300. In these figures, the device comprises two inflatable bodies 305 and a plurality of air flow modifying elements 310. The air flow modifying elements 310 are not inflatable bodies.

Specifically, the device 300 comprises a suction side portion 315, a pressure side portion 320, a leading edge connecting element 325 and a trailing edge connecting element 326. A leading edge connecting element 325 connects a leading edge portion of the suction side portion 315 and a leading edge portion of the pressure side portion 320. Likewise, a trailing edge connecting element 326 connects a trailing edge portion of the suction side portion 315 and a trailing edge portion of the pressure side portion 320. The device 300 may be sized such that a gap 316 between the connecting elements 325, 326 and the corresponding leading 260 and trailing 270 edges may be provided. The gaps 316 may be kept while the device 300 is in use, i.e. during all the time that the device is in use. The connecting elements 325, 326 may increase the sturdiness and stability of the device 300. The trailing edge connecting element 326 may help to protect the serrations of the wind turbine blade 22.

The suction side portion of the device 315 comprises a suction side inflatable body 335 configured to face a suction side 250 of the wind turbine blade 22 and three suction side air flow modifying elements 331. Likewise, the pressure side portion of the device 320 comprises a pressure side inflatable body 340 configured to face a pressure side 240 of the wind turbine blade 22 and three pressure side air flow modifying elements 341.

Like in the example of FIGS. 6A and 6B, inflating the inflatable bodies 310 may cause them to grip the wind turbine blade 22 and to provide a vibration mitigation functionality of the device 300.

One or more air flow modifying elements may be fins or plates. The suction side 331 and pressure side 341 air flow modifying elements are fins in the example of FIGS. 7A and 7B. The fins may be rigid and configured to keep a substantially same shape in the absence of wind as in the presence of wind. In other examples, the fins may be pivoting or flexible fins, i.e. the fins may be configured to follow a main or predominant direction of the wind. If the fins of the examples of FIGS. 7A and 7B were pivoting fins, the fins 331, 341 would be shown in an unloaded condition, i.e. in absence of wind, in these figures. Substantially rigid fins may help to add drag in oscillations and help to mitigate wind turbine vibrations. Substantially flexible or pivoting fins may help to avoid or at least reduce vortices being shed by the device 300. Flexible fins may also add drag and help to mitigate wind turbine vibrations.

In the examples of flexible fins, the fins may be stiff enough such that in an unloaded condition they keep a substantially deployed configuration. The fins may be configured to resist substantial bending until they are subjected to an external force such when subjected to wind gusts. The fins 331, 341 may also be flexible enough such that in a loaded condition, i.e. in the presence of wind, they are able to follow the wind. For instance, the flexible fins may be configured such that, when the vibration mitigating device 300 is mounted to a wind turbine blade 22, the device 300 and the plurality of fins may form a U-shaped or tear-shaped profile in cross-section.

In some examples, an angular distance 350 between consecutive fins, both for a plurality of substantially rigid fins and for a plurality of substantially flexible fins (an angular distance would be measured in the absence of wind for the flexible/pivoting fins), in cross-section may be substantially constant. An angular distance 350 may be understood as an angle between the two imaginary lines joining a (geometric) center of a vibration mitigating device and two consecutive air flow modifying elements in cross-section.

This is also applicable to other types of air flow modifying elements 310. For example, an angular distance 350 between consecutive protrusions 310 of the device of FIGS. 6A and 6B may also be constant.

At least for the rigid fins, this may help to stabilize the vibration mitigating device when mounted around a wind turbine blade and wind blows from different directions. Undesired behavior and instabilities induced by the wind blowing from different directions may be avoided or at least reduced with respect to having a plurality of fins with a variable angular distance between adjacent fins. A response of the device 300 to wind gusts coming from different directions may be more homogeneous, i.e. the behavior of the device 300 may be independent from the wind direction. A device 300 which may react similarly regardless the blowing direction of the wind may enable a more predictable and stable behavior than other devices. Also, effects of torsional loads caused by the device 300 may be avoided or reduced.

In some examples, all the fins 331, 341 may have a substantially same height 369. A height may be measured in a radial direction of the device 300. In other examples, the fins may have different heights. In some of these examples consecutive fins may have alternating heights 369. A first group of fins 371 may have a first height, and a second group of fins 372, which is tangentially displaced with respect to the first group of fins 371, may have a second height bigger than the first height. The second height may be about twice of the first height in some examples. The alternating heights in a tangential direction is also applicable to other types of air flow modifying elements. For instance, the air flow modifying elements of the example of FIGS. 6A and 6B may also have alternating heights. Likewise, the air flow modifying elements of FIGS. 6A and 6B may also have a substantially constant angular distance 307 between them in cross-section.

The above height 369 considerations are also applicable to the protrusions of the device of FIGS. 6A and 6B.

In some examples, the fins 331, 341 may be non-permeable so that air would not be able to go through the fins, but instead would be forced to flow around them. In other examples, one or more fins, including all the fins, may be permeable, i.e. they may comprise a plurality of holes, channels or pores such that air can pass through them, and therefore could pass from one side of a fin to the other side of the fin.

In some examples, the fins may have serrated outer edges. Serrated edges may reduce the noise produced by wind flowing around the fins. Serrated edges may also reduce a spanwise coherence and a length of the set of vortices shed, which may positively influence the intensity of the vortex shedding.

The suction side 331 and pressure side 341 fins may extend substantially parallel to a longitudinal direction 345, such as in the examples of FIGS. 7A and 7B. In other examples, one or more fins may form an angle 351 with a longitudinal direction 345 of the device in a top or bottom view of the device, see FIG. 8A.

FIG. 8A schematically shows a top view of the suction side inflatable body 335 of FIGS. 7A and 7B, the fin on the inflatable body 335 forming an angle 351 with the longitudinal direction 345 of the device. Similarly, the suction side 331 and pressure side 341 fins may extend substantially parallel to a radial direction 343 of the device, as in FIGS. 7A and 7B. In other examples, the suction side 331 and pressure side 341 fins may form an angle 352 with a radial direction 343 of the device in a front or back view of the device, see FIG. 8B. FIG. 8B schematically shows a front view of the suction side inflatable body 335 of FIGS. 7A and 7B, the fin on the inflatable body forming an angle 352 with a radial of the device.

In some examples, the suction side and pressure side air flow modifying elements may be an undulated strake. A strake may be understood as one or more rigid fins that meander along or partially around a length of the inflatable body. The undulated strake may break vortices and thus reduce their ability to correlate along a spanwise direction 345. The vibrations may be further mitigated by the strake.

In some examples, flexible joints may be used to attach the fins or strakes to an inflatable body 305 and/or to a connecting element. For instance, hinges, including flexible hinges, may be used. In some examples hinges may comprise plastic. In other examples, the device 300 may comprise a sleeve, e.g. a tubular or cylindrical sleeve, to which the fins or strakes are attached. Hinges such as flexible hinges may be used to attach the fins or strakes to the sleeve. The inflatable bodies 305 may be attached, e.g. through an adhesive, to a surface of the sleeve configured to face a wind turbine blade surface, e.g. a pressure side and suction side surface of the blade 22. The sleeve may be rigid or semi-rigid in some of these examples. The connecting elements 325, 326 may be part of the sleeve.

In some examples, the leading edge connecting element 325 and/or the trailing edge connecting element 326 may also be configured to function as an air flow modifying element 310. For example, the size and/or the material of a connecting element may be adjusted to provide such functionality.

In some examples, the suction side 331 and pressure side 341 air flow modifying elements and/or the leading edge 325 and trailing edge 326 connecting elements may comprise one or more plastics. A plastic may confer certain stiffness, i.e., a certain resistance to deformation in response to an applied force, to the air flow modifying elements such that their shape is maintained. In other examples, the suction side 331 and pressure side 341 air flow modifying elements and/or the leading edge 325 and trailing edge 326 connecting elements may comprise a textile-based cover such as a cloth or tarp attached to a portion of a suitable supporting structure, e.g. to a lightweight frame. The frame may in some examples be rectangular.

In some examples, a thickness of the air flow modifying elements 310, e.g. measured along a tangential direction 342, may be negligible or very small in comparison to its length 339 and its height 369, see FIGS. 7A and 7B. Still in other examples, the air flow modifying elements 310 may be made of foam.

Figure 9A:
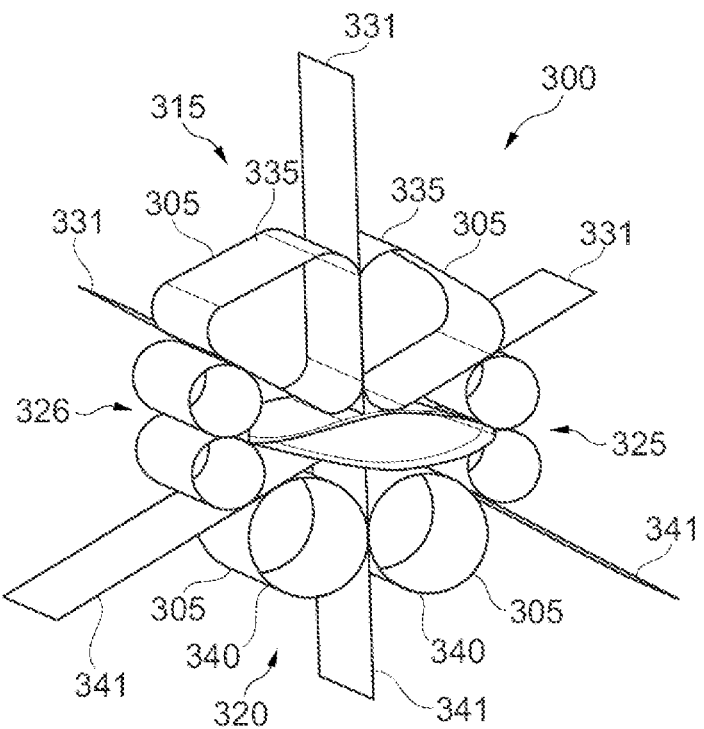
FIGS. 9A and 9B schematically illustrate two perspective views of another example of a vibration mitigating device.
Figure 9B:
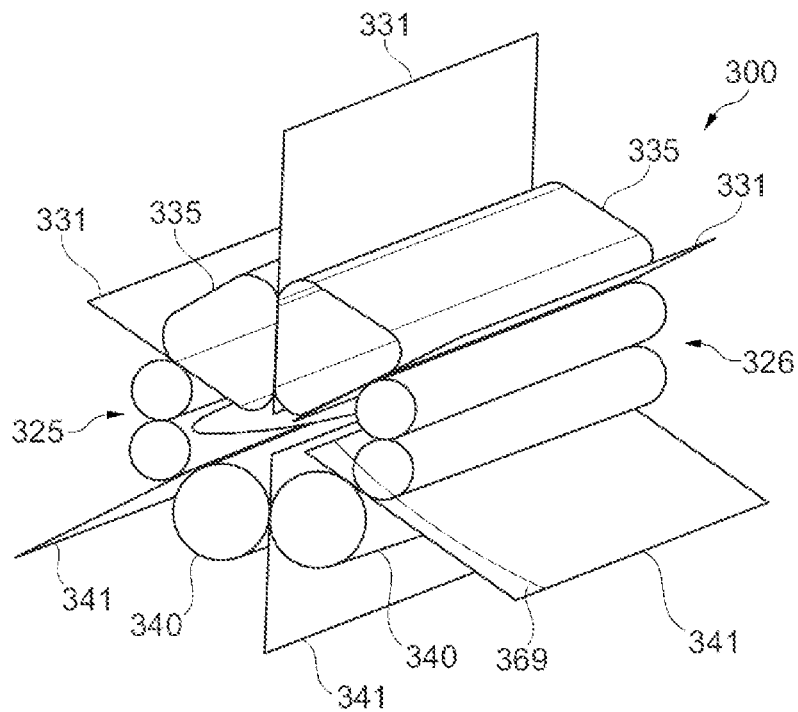

FIGS. 9A and 9B schematically illustrate two perspective views of another example of a vibration mitigating device 300. In this example, the suction side portion 315 of the device comprises three fins 331 and two inflatable bodies 335, and the pressure side portion 340 of the device comprises three fins 341 and two inflatable bodies 340. The suction side inflatable bodies 335 may have a circular cross-section and the pressure side inflatable bodies 340 may have a triangular cross-section in this example. Similarly to the examples of FIGS. 7A and 7B, the inflatable bodies having a triangular cross-section have rounded corners such that they can contact a local outer surface of the wind turbine blade. Although the inflatable bodies having a circular cross-section do not seem to be touching a local outer blade surface in FIGS. 9A and 9B, it should be understood that, when inflated, they are to press against the corresponding outer surfaces of the wind turbine blade.

The leading edge connecting element 325 and the trailing edge connecting element 326 of the device of FIGS. 9A and 9B are cylinders and may thus have a circular cross-section. In this example, the cross-sectional dimensions of the leading and trailing edge cylinders may be smaller than the cross-sectional dimensions of the inflatable bodies 335, 340 at pressure and suction side. The cylinders may in some examples be substantially rigid, such that their shape is maintained with time. In other examples, they may be inflatable.

The fins 331, 341 of the device of FIGS. 9A and 9B extend between the suction side and pressure side inflatable bodies 335, 340. A suitable adhesive may join each fin to the corresponding inflatable bodies 335, 340. The structural stability of the device 300 may be improved. Alternatively, as in the examples of FIGS. 7A and 7B, the fins may start in a radially outer portion of the inflatable bodies.

In some examples, as in FIGS. 9A and 9B, one or more inflatable bodies 305 may separate adjacent air flow modifying elements 310, e.g. along a tangential direction 342 of the vibration mitigating device 300.

In a further aspect of the disclosure, a method 400 for mitigating vibrations of a parked wind turbine 10 is provided. The wind turbine 10 comprises a tower 15, a nacelle 16, a hub 20 and one or more wind turbine blades 22. The wind turbine blades 22 have a root 210, a tip 22 and exterior surfaces defining a pressure side 240, a suction side 250, a leading edge 260 and a trailing edge 270. The exterior surfaces extend in a generally spanwise direction from the root 210 to the tip 220. At least one of the wind turbine blades 22 comprises a vibration mitigating device 300 arranged around the wind turbine blade 22. The device 300 comprises one or more inflatable bodies 305 and one or more air flow modifying elements 310.

Figure 10:
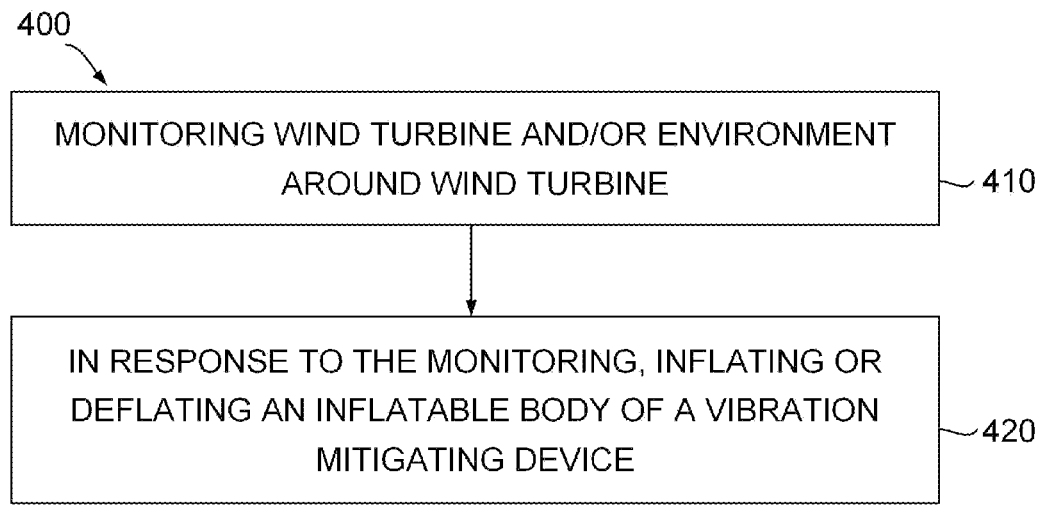
FIG. 10 shows a flow chart of a method for mitigating wind turbine vibrations.

The method, which is schematically illustrated in FIG. 10, may be particularly used during installation and/or during commissioning of the wind turbine The method may also be used when the wind turbine is stopped after it has been operating (i.e. producing energy), e.g. during maintenance or repair.

The method comprises, at step 410, monitoring at least one of the wind turbine 10 and the environment around the wind turbine. The method further comprises, at step 420, inflating or deflating one or more of the inflatable bodies 305 of the vibration mitigating device 300 in response to the monitoring.

By monitoring the wind turbine 10, e.g. its vibrations, and/or its environment, e.g. wind speed, it may be detected whether a level of vibration mitigation provided by the vibration device 300 is sufficient or whether more vibration mitigation is required. The inflation level of one or more inflatable bodies 305 of the device 300, e.g. all the inflatable bodies, may be continuously monitored and adjusted. Regulation of the vibration mitigation in real time may therefore be provided. The performance of the vibration mitigating device 300 may accordingly be tailored to the prevailing situation and needs of the wind turbine. The vibration mitigation may be more efficient in this manner. Also, if the vibration mitigating device 300 unexpectedly causes undesired loads or vibrations, the effect of the device can be controlled. The device may for example be deflated and kept around the blade instead of having to remove device for installing it afterwards.

In some examples, monitoring may comprise detecting a predefined or predetermined condition, i.e. a certain condition that a wind turbine may detect, e.g. by measuring one or more parameters such as wind speed, loads, vibrations and more. While the predefined condition is not detected, e.g., while a value measured by a sensor system 92 is below a threshold, the wind turbine may keep a certain inflation level of one or more inflatable bodies. The detection of a predefined condition may serve as a trigger for inflating/deflating one or more inflatable bodies 305. In some examples, a predefined condition may be related to an excessive risk of damage to the wind turbine e.g. due to excessive wind turbine vibrations.

Monitoring may comprise sensing one or more of wind speed, wind turbine loading and rotational speed of the wind turbine rotor in some examples. More than one parameter may be monitored at a same time.

A shaft sensor 51 or a generator sensor 53 may be used. Wind speed may be determined by a meteorological measurement system 58, e.g. a wind anemometer. Wind speed may also be derived from a rotor speed, optionally in combination with a pitch angle.

Wind turbine loading may include at least one of forces, stresses and pressures. A shaft sensor 51 may be used for determining wind turbine loads and vibrations. In general, different types of sensors arranged at different wind turbine locations, such as bearings and or roots of blades, known in the art may be used to measure the relevant parameters. One or more suitable sensors may also be arranged with, e.g. on, a wind turbine blade.

A suitable wind turbine controller, e.g. the main wind turbine controller, may receive information from the one or more sensors 97 and detect a predefined condition. In some examples, the predefined condition may be detected when a parameter, e.g. a parameter indicative of wind turbine vibration, has reached or exceeded a threshold.

In response to the monitoring, e.g. after detecting a predefined condition, one or more, including all, the inflatable bodies 305 of the device may be inflated or deflated, as deemed appropriate. If there are multiple inflatable bodies 305, inflation or deflation of different inflatable bodies 305 may be performed at different times. The time periods in which two or more inflatable bodies 305 are inflated or deflated, as appropriate, may totally overlap, may partially overlap or may be sequential and non-overlapping. By controlling and adapting the inflation/deflation of the inflatable bodies 305, the effect of the vibration mitigating device 300 may be adjusted to the needs of the wind turbine with time, and therefore the performance of the vibration mitigating device 300 may be improved and be more efficient.

A suitable pressure source 98 such as a pump or a compressor may output a fluid that a hose 99 connected between the pressure source 98 and an inflatable body 305 carry into the inflatable body. The fluid may be air, a suitable gas or in general a suitable fluid. A pressure regulator may be used for regulating the pressure of the fluid provided by the pressure source 98 and which is to be introduced into an inflatable body 305 through a corresponding inlet 95 of the inflatable body.

As explained before, inflation and/or deflation may be performed through one or more hoses 99. One or more pressure sources 98 may be used. The pressure source(s) 98 may for example be in the hub 20. Other locations of the pressure source(s), for example the nacelle 16, are possible. In other examples, the pressure source(s) may be incorporated in the device 300, e.g. they may be integrated with the inflatable bodies 305 of the vibration mitigating device 300.

The method may further comprise releasably attaching a vibration mitigating device 300 around a wind turbine blade 22 by inflating at least one inflatable body 305 of the vibration mitigating device 300.

Releasably attaching may comprise partially inflating at least an inflatable body of the device before positioning the device around the blade. This may facilitate arranging the device around the wind turbine blade, e.g. around a blade tip region.

In some examples the vibration mitigating device 300 may be mounted to a wind turbine blade 22 of a rotor 18 already placed on top of the tower 15. In some of these examples, one or more ropes 89 may be lowered from a hub 20 or a nacelle 16 and then attached to the device 300, e.g. to one or more suitable anchor points of the device. The wind turbine blade 22 on which the device 300 is going to be arranged may be pointing downwards, i.e. it may substantially be at a six o'clock position. If the blade 22 is at a different position, the rotor 18 may be rotated to position the blade substantially pointing downwards. The device 300 may be mounted to a blade 22 at a different position, e.g. by using an additional rope attached to a tip end of the device (the end of the device which is to be closest to the blade tip) to help to lift the device. But it may be easier and faster to install the device 300 with the blade 22 pointing downwards. After installing a vibration mitigating device 300 on a first blade, the wind turbine rotor may be rotated such that a subsequent blade is in the six o'clock position and points downwards.

In some other examples, a vibration mitigating device 300 may be installed and uninstalled using one or more drones, e.g. at least two drones. The drones may be connected to a device 300 by one or more ropes. The drones may carry the device 300 towards a blade 22, e.g. from a ground 12, a nacelle 16 or a hub 20, and cause the device to surround a wind turbine blade 22.

The device 300 may also be installed around a blade 22 which is yet to be attached to the wind turbine rotor 18. In these examples, one or more lifting devices such as a crane may lift the blade. The blade 22 may be for example be vertically positioned, such that the tip 220 is pointing downwards. In other examples, the blade may be positioned in a different manner, e.g. horizontally. The device 300 may then be moved, e.g. slid, around the blade 22. One or more ropes may be used to move the device around the blade. Inflating one or more inflatable bodies of the vibration mitigating device may cause the vibration mitigating device to grip the wind turbine blade in some examples. Although the inflation of one or more of the inflatable bodies of the device 300 is controlled herein to adapt to the vibrations experienced, it may also be possible to inflate the device to cause it to grip the wind turbine blade and leave it totally inflated during all the time in which it is in use. One or more valves in the inflatable bodies may help to keep the inflatable bodies totally inflated.

In some examples, the device 300 may be attached by one or more securing ropes 89 to the wind turbine 10, e.g. to a wind turbine blade 22, the hub 20 or the nacelle 16. In some examples, the inflatable bodies 305 are inflated before the vibration mitigating device 300 is secured by one or more ropes 89 to the wind turbine, e.g. once the device 300 is around a tip portion 225 of a wind turbine blade. In other examples, the inflatable bodies 305 are inflated after the device 300 is secured by one or more ropes 89. In some examples, two, three or four ropes 89 may be used.

If the device 300 is mounted on an uninstalled blade 22, the method may further comprise installing the wind turbine blade 22. The blade 22 may be first attached to the hub 20 and the hub 20 and the blade 22 may be lifted together, or the hub 20 may be mounted up tower first and then the blade 22 with the device 300 may be lifted and connected to the hub 20.

Once an installed blade 22 comprises a device 300, the rotor 18 may be rotated for mounting another device 300 on another blade 22 or for attaching another blade 22, e.g. with a mounted device 300. If drones are used, this may be avoided as the devices 300 may be mounted at overlapping time periods on different blades.

Once a wind turbine 10 comprises one or more blades 22 with one or more devices 300 installed, the devices 300 may reduce wind turbine vibrations, e.g. vortex induced vibrations and/or stall induced vibrations.

The device 300 may stay mounted around the blade 22 until operation of the wind turbine is started or resumed. The method may further comprise removing the device 300 from the wind turbine blade 22 before starting or resuming operation. If more than one device 300 is installed, all of them may be removed before starting or resuming operation.

Removing a vibration mitigating device 300 may comprise deflating at least in part one or more inflatable bodies 305 of the device 300. This may facilitate removing the device. One or more pressure sources 98 may be used to deflate the device 300.

Removing a device 300 may further comprise detaching one or more securing ropes 89 and letting the device 300 fall by the action of gravity. The blade 22 may be pointing downwards, i.e. the blade may be at a substantially six o'clock position. If the blade 22 is not in this position, the rotor 18 may be rotated to put the blade 22 pointing downwards. A device 300 may be used more than once in a same or a different wind turbine.

In some examples, one or more inflatable bodies 305 of the device may be deflated at least in part before one or more securing ropes 89 are detached. In other examples, one or more inflatable bodies 305 may be deflated at least in part after one or more securing ropes 89 are detached.

If one or more drones are used to uninstall the devices 300, the drones may carry them to a ground, hub or nacelle in some examples.

Figure 11:
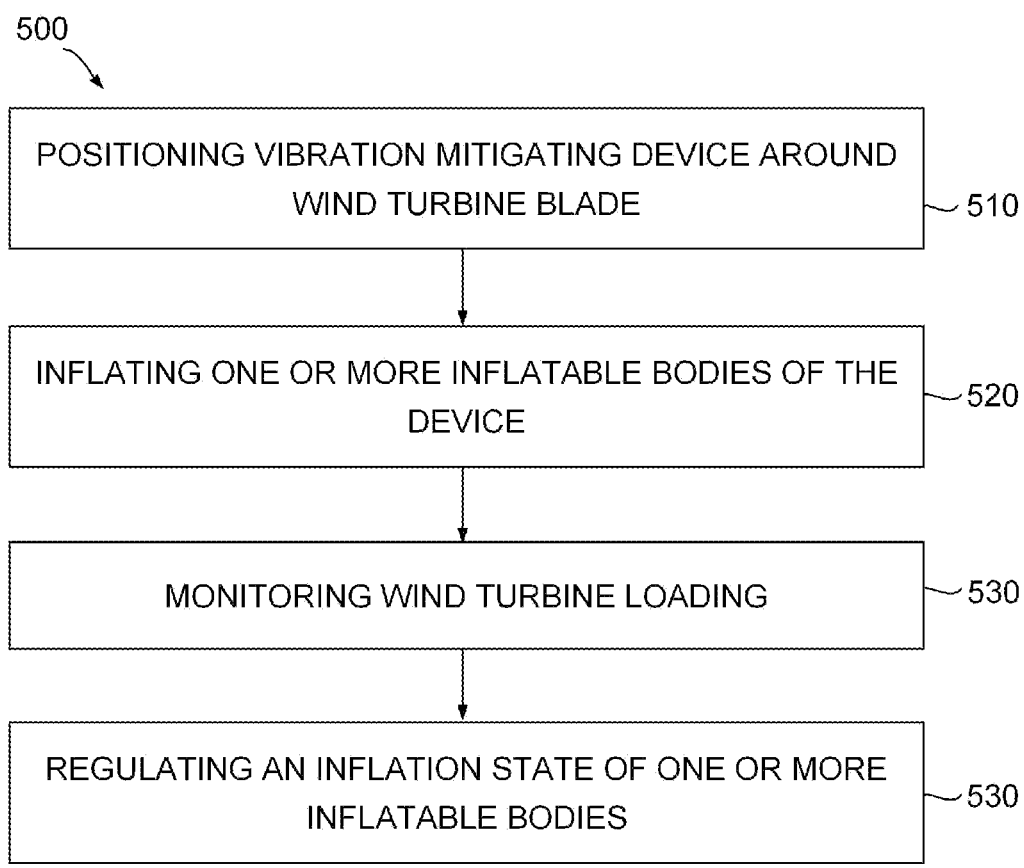
FIG. 11 shows a flow chart of another method for mitigating wind turbine vibrations.

In a further aspect of the disclosure, a method 500 for mitigating vibrations of a parked wind turbine is provided. The method is schematically illustrated in FIG. 11. The method comprises, at block 510, releasably positioning a vibration mitigating device 300 comprising one or more inflatable bodies 305 and one or more air flow modifying elements 310 around a wind turbine blade 22. The method further comprises, at block 520, inflating one or more inflatable bodies 305 for securing the vibration mitigating device to the wind turbine blade. The method further comprises, at block 530; monitoring wind turbine loading. The method further comprises, at block 540; based on the wind turbine loading, regulating an inflation state of one or more inflatable bodies 305 of the vibration mitigating device 300.

Inflating one or more inflatable devices 305 may be sufficient to secure the vibration mitigating device 300 to the wind turbine blade 22. In some examples, one or more ropes 89 may be additionally used to finish securing the device 300 to the wind turbine 10.

For regulating the inflation state, in some examples a pressure source 98 in a wind turbine hub 20 may cause a fluid to enter or to exit one or more inflatable bodies 305.

In some examples, a wind turbine controller 36 may analyze the output of one or more sensors 97 monitoring wind turbine loading and may send control signals to one or more pressure sources 98.

The method may further comprise removing the vibration mitigating device 300 from the wind turbine blade 22 before starting or resuming operation. Removing the vibration mitigating device 300 may comprise at least partially deflating one or more inflatable bodies 305 of the vibration mitigating device 300.

Explanations and features regarding previous assemblies 82, vibration mitigation devices 300, wind turbines 10 and method 400 may apply to this method 500. Likewise, details of this method may be applicable to the previous aspects too.

This written description uses examples to disclose the teaching, including the preferred embodiments, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. An assembly for a wind turbine blade of a wind turbine, comprising:
    a vibration mitigating device configured to be arranged around the blade, the vibration mitigating device comprising:
        a main body configured to extend chord-wise around and encircle the blade, the main body comprising at least one inflatable body;
        a plurality of inflatable air flow modifying elements extending radially outward from the main body;
    a pressure source connectable to the at least one inflatable body and the air flow modifying elements to inflate the at least one inflatable body and the airflow modifying elements based on measurements of a sensor system that monitors a condition of the wind turbine or an environmental condition around the wind turbine;
    wherein the pressure source is configured to regulate an inflation level of the at least one inflatable body and the air flow modifying elements such that the inflation level is controlled based on variations or changing circumstances detected by the sensor system; and
    wherein the at least one inflatable body comprises a longitudinal length in a span-wise direction of the blade, the plurality of inflatable air flow modifying elements configured as inflatable plates extending radially outward from the at least one inflatable body and extending completely along the longitudinal length of the at least one inflatable body.

2. The assembly of claim 1, wherein the pressure source comprises a pump or a compressor.

3. The assembly of claim 1, wherein the main body includes a plurality of the inflatable bodies having different cross-sectional shapes, the pressure source comprising a dedicated pressure device for each of the individual inflatable bodies.

4. The assembly of claim 1, wherein the air flow modifying elements are defined by inflatable extensions of the at least one inflatable body.

5. The assembly of claim 1, wherein a first group of the plurality of air flow modifying elements is configured to be arranged at a suction side of the blade and a second group of the plurality of air flow modifying elements is configured to be arranged at a pressure side of the blade when the vibration mitigating device is mounted on the blade.

6. A wind turbine, comprising:
    a tower;
    a nacelle;
    a hub with one or more blades;
    at least one of the blades comprising a vibration mitigating device arranged around the blade, the vibration mitigating device comprising:
        a main body extending chord-wise around and encircling the blade, the main body comprising at least one inflatable body;
        a plurality of inflatable air flow modifying elements extending radially outward from the main body;
    a sensor system that monitors a condition of the wind turbine or an environmental condition around the wind turbine;
    a pressure source connected to the at least one inflatable body and the inflatable airflow modifying elements, the pressure source located in the wind turbine or in the vibration mitigating device;
    wherein the pressure source is configured to regulate an inflation level of the at least one inflatable body and the air flow modifying elements such that the inflation level is controlled based on variations or changing circumstances detected by the sensor system; and
    wherein the at least one inflatable body comprises a longitudinal length in a span-wise direction of the blade, the plurality of inflatable air flow modifying elements configured as inflatable plates extending radially outward from the at least one inflatable body and extending completely along the longitudinal length of the at least one inflatable body.

7. The wind turbine of claim 6, wherein the sensor system comprises one or more load sensors that detect loads on at least one of: a shaft of the wind turbine, a generator of the wind turbine, or one or more of the blades.

8. The wind turbine of claim 6, wherein the sensor system is configured to measure at least one of: wind speed, wind direction, air density, or wind turbulence.

9. The wind turbine of claim 6, wherein the pressure source is arranged in one of the wind turbine hub, the nacelle, or the blade, and a hose fluidly connects the at least one inflatable body to the pressure source.

10. The wind turbine of claim 6, wherein the vibration mitigating device is secured to the blade by one or more ropes.

11. A method for mitigating vibrations of a parked wind turbine, the method comprising;
    arranging a vibration mitigating device around at least one blade of the parked wind turbine, the vibration mitigating device comprising;
        a main body extending chord-wise around and encircling the blade, the main body including at least one inflatable body;
        a plurality of inflatable air flow modifying elements extending radially outward from the main body;
        the at least one inflatable body comprising a longitudinal length in a span-wise direction of the blade, the plurality of inflatable air flow modifying elements configured as inflatable plates extending radially outward from the at least one inflatable body and extending completely along the longitudinal length of the at least one inflatable body;
        a pressure source connected to the at least one inflatable body and the plurality of airflow modifying elements;
    with a sensor system, monitoring a condition of the wind turbine or an environmental condition around the wind turbine; and
    regulating an inflation level of the at least one inflatable body and the air flow modifying elements by inflating or deflating the at least one inflatable body and the air flow modifying elements by an amount based on variations or changing circumstances detected by the sensor system.

12. The method of claim 11, wherein the monitoring comprises sensing one or more of wind speed, wind turbine loading, or rotational speed of a rotor of the wind turbine.

13. The method of claim 11, further comprising releasably attaching the vibration mitigating device around the blade by inflating the at least one inflatable body.

14. The method of claim 13, comprising partially inflating the at least one inflatable body before arranging the vibration mitigating device around the blade.

15. A method for mitigating vibrations of a parked wind turbine, the method comprising:
releasably positioning a vibration mitigating device chord-wise around a blade of the wind turbine, the vibration mitigating device comprising a main body configured to extend chord-wise around and encircle the blade, the main body comprising at least one inflatable body and a plurality of inflatable airflow modifying elements extending radially outward from the main body, wherein the at least one inflatable body comprise a longitudinal length in a span-wise direction of the blade and the plurality of inflatable air flow modifying elements are configured as inflatable plates extending radially outward from the at least one inflatable body and extending completely along the longitudinal length of the at least one inflatable body;
inflating the at least one inflatable body and the plurality of airflow modifying elements to secure the vibration mitigating device around the blade;
monitoring wind turbine loading; and
based on the wind turbine loading, regulating an inflation state of the at least one inflatable body and the plurality of airflow modifying elements such that an inflation level thereof is controlled based on variations or changes in the wind turbine loading detected by the sensor system.

16. The method of claim 15, comprising using a pressure source in a hub of the wind turbine to regulate the inflation state of the at least one inflatable body and the plurality of airflow modifying elements.

17. The method of claim 16, wherein a wind turbine controller analyzes an output of one or more sensors monitoring the wind turbine loading and sends control signals to the pressure source.

18. The method of claim 15, further comprising removing the vibration mitigating device from the blade before starting or resuming operation of the wind turbine.

19. The method of claim 18, comprising at least partially deflating the at least one inflatable body to remove the vibration mitigating device.

20. A wind turbine, comprising:
a tower;
a nacelle;
a hub with one or more blades;
at least one of the blades comprising a vibration mitigating device arranged around the blade, the vibration mitigating device comprising:
a main body extending chord-wise around and encircling the blade, the main body comprising at least one inflatable body;
a plurality of inflatable air flow modifying elements extending radially outward from the main body;
a sensor system that monitors a condition of the wind turbine or an environmental condition around the wind turbine;
a pressure source connected to the at least one inflatable body and the inflatable airflow modifying elements, the pressure source located in the wind turbine or in the vibration mitigating device;
wherein the pressure source is configured to regulate an inflation level of the at least one inflatable body and the air flow modifying elements such that the inflation level is controlled based on variations or changing circumstances detected by the sensor system; and
wherein the main body includes a plurality of the inflatable bodies having different cross-sectional shapes, the pressure source comprising a dedicated pressure device for each of the individual inflatable bodies.

* * * * *